(12) United States Patent
Nishiyama et al.

(10) Patent No.: US 11,294,612 B2
(45) Date of Patent: Apr. 5, 2022

(54) EXTENDING BIOS CONTROL OVER A GENERAL PURPOSE OS DISPLAY TO A DEDICATED DISPLAY SCREEN BASED ON CONNECTED EXTERNAL PERIPHERAL

(71) Applicant: LENOVO (Singapore) PTE. LTD., New Tech Park (SG)

(72) Inventors: Masaru Nishiyama, Yokohama (JP); Nozomi Mandokoro, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 163 days.

(21) Appl. No.: 16/738,741

(22) Filed: Jan. 9, 2020

(65) Prior Publication Data
US 2020/0225895 A1 Jul. 16, 2020

(30) Foreign Application Priority Data

Jan. 15, 2019 (JP) .............................. JP2019-004589

(51) Int. Cl.
*G06F 3/14* (2006.01)
*G06F 9/445* (2018.01)
(Continued)

(52) U.S. Cl.
CPC .............. *G06F 3/14* (2013.01); *G06F 9/4451* (2013.01); *G06F 3/067* (2013.01); *G06F 3/0607* (2013.01);
(Continued)

(58) Field of Classification Search
CPC ........ G06F 3/14; G06F 3/0632; G06F 3/0607; G06F 3/0647; G06F 3/0653; G06F 3/067; G06F 8/65
See application file for complete search history.

(56) References Cited

U.S. PATENT DOCUMENTS 5,038,320 A * 8/1991 Heath ................... G06F 9/4411
710/10
5,136,711 A * 8/1992 Hugard .................. G06F 9/441
710/74
(Continued)

FOREIGN PATENT DOCUMENTS

JP 10105271 A 4/1998

*Primary Examiner* — Tammara R Peyton
(74) *Attorney, Agent, or Firm* — Kunzler Bean & Adamson

(57) ABSTRACT

A method for changing over a general-purpose OS display for an information processing apparatus to a dedicated display screen includes accessing a setup procedure describing setup processing and at least an account generating process for generating user account information for a general-purpose operating system ("OS"). The method includes accessing changeover information for changing over a general-purpose OS display screen for the information processing apparatus to a dedicated display screen, and in response to starting up the general-purpose OS for the first time, executing the setup processing including the user account generating process based on the setup procedure stored by the procedure storage unit, changing over the general-purpose OS display screen to the dedicated display screen based on the changeover information stored by the changeover information storage unit, and displaying the dedicated display screen. An apparatus and a program product perform the method.

20 Claims, 6 Drawing Sheets

(51) Int. Cl.
 *G06F 9/4401* (2018.01)
 *G06F 3/06* (2006.01)
 *G06F 8/65* (2018.01)

(52) U.S. Cl.
 CPC .......... *G06F 3/0632* (2013.01); *G06F 3/0647* (2013.01); *G06F 3/0653* (2013.01); *G06F 8/65* (2013.01); *G06F 9/4401* (2013.01)

(56) References Cited

U.S. PATENT DOCUMENTS

| | | | | |
|---|---|---|---|---|
| 5,799,187 A * | 8/1998 | McBrearty | ............ | G06F 9/4406 709/222 |
| 6,182,162 B1 * | 1/2001 | Estakhri | .............. | G06F 13/4081 710/11 |
| 6,477,642 B1 * | 11/2002 | Lupo | ..................... | G06F 9/4401 713/1 |
| 6,604,152 B1 * | 8/2003 | Bard | ................... | G06F 9/44573 710/10 |
| 6,948,006 B1 * | 9/2005 | Taguchi | .................. | G06F 13/12 710/8 |
| 7,522,554 B2 * | 4/2009 | Chan | ...................... | H04H 20/26 370/328 |
| 7,844,812 B2 * | 11/2010 | Kawano | .................... | G06F 1/24 713/2 |
| 8,943,232 B2 * | 1/2015 | Dalal | ...................... | G06F 13/14 710/10 |
| 9,111,604 B2 * | 8/2015 | Reisman | ................... | G06F 8/65 |

* cited by examiner

EXTENDING BIOS CONTROL OVER A GENERAL PURPOSE OS DISPLAY TO A DEDICATED DISPLAY SCREEN BASED ON CONNECTED EXTERNAL PERIPHERAL

CROSS-REFERENCE TO RELATED APPLICATIONS

This patent application claims priority to Japanese Patent Application No. JP2019-004589 filed on Jan. 15, 2019 for Masaru Nishiyama and Nozomi Mandokoro, titled Electronic Apparatus, Control Method, and Program, the entire contents of which are incorporated herein by reference for all purposes.

FIELD

The subject matter disclosed herein relates to controlling operational state of an electronic apparatus and more particularly relates to controlling operational state of an electronic apparatus and limiting transition based on user input.

BACKGROUND

Nowadays, an information processing apparatus of the type that a general-purpose OS (Operating System) such as Windows® will and so forth is loaded is widely used. In such an information processing apparatus, it is necessary to perform setup that various initial settings and customization of the general-purpose OS are performed in using the information processing apparatus for the first time and therefore the setup is performed by using an input device such as a keyboard, a mouse and so forth in related-art information processing apparatuses.

In addition, a technique of performing the setup on an information processing apparatus which is not equipped with the input device by using a remote terminal is known (see, for example, Japanese Unexamined Patent Application Publication No. Hei 10 (1998)-105271).

BRIEF SUMMARY

In some information processing apparatuses such as described above, it may be necessary for a user to input setting information from the input device and the remote terminal in performing the setup and processing for setup is complicated.

The various embodiments disclosed herein been made in order to solve the above-described problems and aims to provide an information processing apparatus and a setup method which make it possible to perform the setup simply and easily.

In order to solve the above-mentioned problems, an information processing apparatus according to the first aspect of the in various embodiments disclosed herein includes a procedure storage unit which is configured to store a setup procedure which describes the procedure for setup processing, that is, the setup procedure which includes at least an account generating process for generating user account information which is necessary in using a general-purpose OS (Operating System) and a setup processing unit which is configured to execute the setup processing for the information processing apparatus which includes the user account generating process based on the setup procedure that the procedure storage unit stores in starting up the general-purpose OS which is in an initial state for the first time.

In addition, the information processing apparatus according to the first aspect of the in various embodiments disclosed herein may further include a changeover information storage unit which is configured to store changeover information which is used to change over a display screen in starting up the general-purpose OS which is in the initial state for the first time, in which, in starting up the general-purpose OS, the setup processing unit may change over the display screen from a standard startup screen of the general-purpose OS to a dedicated display screen based on the changeover information that the changeover information storage unit stores and may display the dedicated display screen.

In addition, the information processing apparatus according to the first aspect of the in various embodiments disclosed herein may further include an external interface unit which is configured to be connectable with an external storage device, in which the setup processing unit may acquire information which is necessary in executing the setup processing from the external storage device which is connected to the external interface unit.

In addition, in the information processing apparatus according to the first aspect of the in various embodiments disclosed herein, network setting information which is used to connect the information processing apparatus to a network may be included in the information which is necessary in executing the setup processing and, in executing the setup processing, the setup processing unit may connect the information processing apparatus to the network based on the network setting information which is acquired from the external storage device.

In addition, in the information processing apparatus according to the first aspect of the in various embodiments disclosed herein, in executing the setup processing, in a case where the information processing apparatus is in a state of being not connected to the network, the setup processing unit may display a display screen which instructs to connect the external storage device from which the network setting information is acquirable to the external interface unit.

In addition, in the information processing apparatus according to the first aspect of the in various embodiments disclosed herein, a process for configuring a setting for utilizing a network storage device which is connectable to the information processing apparatus over the network may be included in the setup procedure and the setup processing unit may perform the setting for utilizing the network storage device based on the setup procedure.

In addition, in the information processing apparatus according to the first aspect of the in various embodiments disclosed herein, a process for installing application software which is adapted to make the information processing apparatus function as a dedicated apparatus for a specific use application may be included in the setup procedure and the setup processing unit may execute the process for installing the application software based on the setup procedure.

In addition, in the information processing apparatus according to the first aspect of the in various embodiments disclosed herein, a process for enabling a function of protecting the application software which is installed by the application software installing process and for restricting installation of other application software may be included in the setup procedure and the setup processing unit may enable the function of protecting the application software and may restrict installation of other application software based on the setup procedure.

In addition, in the information processing apparatus according to the first aspect of the in various embodiments disclosed herein, a process for setting a password which is used to start up the general-purpose OS which is in the initial state and to change a setting of a basic input/output system which controls input/output between the information processing apparatus and the outside may be included in the setup procedure and the setup processing unit may execute the password setting process and may set an initial value of the password which is generated in accordance with a predetermined algorithm which is defined in advance as the password based on the setup procedure.

In addition, in the information processing apparatus according to the first aspect of the in various embodiments disclosed herein, a process for configuring a setting for starting up dedicated software which is installed in advance on a desktop screen in starting up the general-purpose OS in response to execution of the setup processing may be included in the setup procedure and the setup processing unit may perform the setting for starting up the dedicated software on the desktop screen based on the setup procedure in starting up the general-purpose OS in response to execution of the setup processing.

A method and computer program product also perform the functions of the apparatus. For example, a setup method according to the second aspect of the present disclosure is the setup method which is used for an information processing apparatus which includes a procedure storage unit which is configured to store a setup procedure which describes the procedure for setup processing, that is, the setup procedure which includes at least an account generating process for generating user account information which is necessary in using a general-purpose OS (Operating System) and includes the steps of acquiring the setup procedure that the procedure storage unit stores by a setup processing unit in starting up the general-purpose OS which is in an initial state for the first time and executing the setup processing for the information processing apparatus which includes the account generating process by the setup processing unit based on the setup procedure which is acquired in the step of acquiring the setup procedure.

The above-described aspects of the in various embodiments disclosed herein can perform the setup simply and easily.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
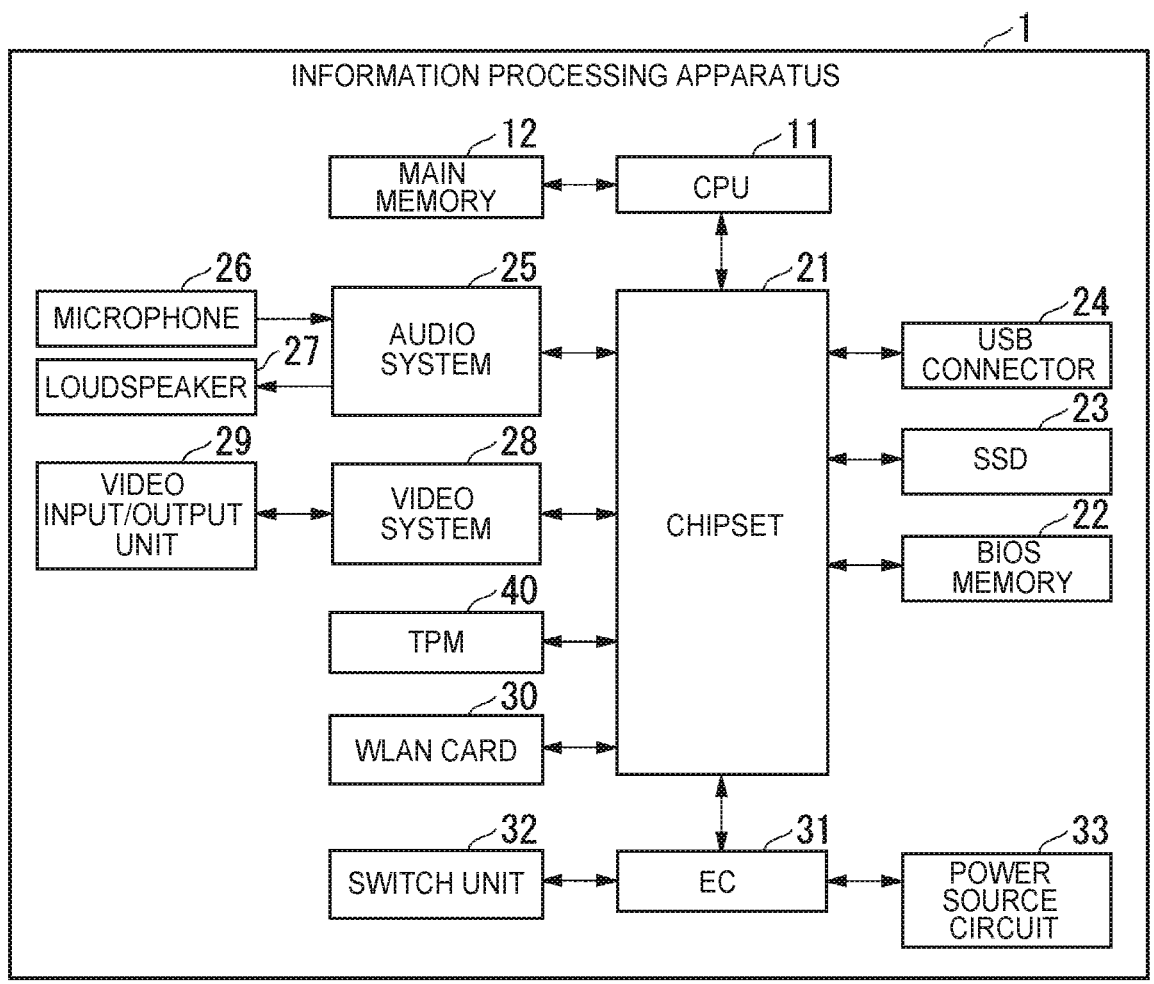
FIG. 1 is a diagram illustrating hardware configurations of an information processing apparatus according to one or more examples of the present disclosure.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "unit" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as units, in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be implemented in code and/or software for execution by various types of processors. An identified unit of code may, for instance, comprise one or more physical or logical blocks of executable code which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of code may be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different computer readable storage devices. Where a unit or portions of a unit are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software units, user selections, network transactions, database queries, database structures, hardware units, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a unit, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a diagram illustrating one example of main hardware configurations of an information processing apparatus 1 according to one embodiment of the in various embodiments disclosed herein.

The information processing apparatus 1 is the apparatus which is configured by, for example, an IoT (Internet of Things) equipment and so forth, is used as a dedicated equipment for a special use application by using a general-purpose OS (Operating System) such as Windows (a registered trademark) and so forth and does not include input devices such as, for example, a keyboard, a mouse and so forth. In the present embodiment, one example of a case where the information processing apparatus 1 is a conference apparatus which is used in a conference system which utilizes a network will be described.

As illustrated in FIG. 1, the information processing apparatus 1 includes, a CPU (Central Processing Unit) 11, a main memory 12, a chipset 21, a BIOS (Basic Input Output System) memory 22, an SSD (Solid State Device) 23, a USB (Universal Serial Bus) connector 24, an audio system 25, a microphone 26, a loudspeaker 27, a video system 28, a video input and output unit 29, a WLAN (Wireless Local Area Network) card 30, an EC (Embedded Controller) 31, a switch unit 32, a power source circuit 33, and a TPM (Trusted Platform Module) 40.

The CPU 11 executes various kinds of arithmetic processing under program control and controls the whole information processing apparatus 1.

The main memory 12 is a writable memory which is utilized as an area into which an execution program of the CPU 11 is read or a work area into which processing data of the execution program is written. The main memory 12 is configured by, for example, a plurality of DRAM (Dynamic Random Access Memory) chips. The OS, various drivers which are adapted to operate peripherals in hardware, various services/utilities, an application program (in the following, referred to as the application) and so forth are included in the execution program.

The chipset 21 includes controllers for a USB, a serial ATA (Advanced Technology Attachment) bus, an SPI (Serial Peripheral Interface) bus, a PCI (Peripheral Component Interconnect) bus, a PCI-Express bus, an LPC (Low Pin Count) bus and so forth and a plurality of devices is connected to the chipset 21. In FIG. 1, the BIOS memory 22, the SSD 23, the USB connector 24, the audio system 25, the video system 28, the WLAN card 30, the EC 31 and the TPM 40 are connected to the chipset 21 as illustrated examples of the devices.

The BIOS memory 22 is configured by an electrically rewritable nonvolatile memory such as, for example, an EEPROM (Electrically Erasable Programmable Read Only Memory), a flash ROM and so forth. The BIOS memory 22 stores therein the BIOS, system firmware which is adapted to control the EC 31 and others and so forth.

The SSD 23 stores therein the OS, the various drivers, the various services/utilities, the application and various kinds of data. The SSD 23 stores therein, for example, Windows 10 (Windows is the registered trademark) and so forth as the OS. In addition, Skype for Business (Skype is a registered trademark), Zoom (a registered trademark) and so forth are installed on the SSD 23 as application software of the conference system.

The USB connector 24 (one example of an external interface unit) is a connector to which peripherals are connected by utilizing the USB. The peripherals which are connected to the USB connector 24 are, for example, a keyboard, a mouse, a USB camera and so forth. Incidentally, a USB key memory 2 (FIG. 2) which will be described later is connected to the USB connector 24 in execution of setup processing of the information processing apparatus 1.

The audio system 25 records, reproduces and outputs sound data. For example, the audio system 25 acquires the sound data from the microphone 26 which is connected to the audio system 25 and outputs the sound data from the loudspeaker 27 which is connected to the audio system 25.

The video system 28 is a system which is adapted to realize a function relating to image display and includes a video controller. The video controller processes a drawing command from the CPU 11 and writes drawing information which is obtained by processing the drawing command into a video memory and, in addition, reads the drawing information out of the video memory and outputs the drawing information to the outside as display data via the video input/output unit 29. In addition, the video system 28 acquires display data which is sent from the outside via the video input and output unit 29.

The video input and output unit 29 is a display port for input from the outside and output to the outside such as, for example, an HDMI (High-Definition Multimedia Interface: HDMI is a registered trademark) and so forth. The video input and output unit 29 is utilized in a case where the display data is acquired from the outside and in a case where the display data is displayed on an external monitor.

The WLAN card 30 performs data communications with the outside by being connected to a network NW1 (FIG. 2) which will be described later via a wireless LAN. The WLAN card 30 performs data communications with various devices (a network storage device 4, a management server 5 and so forth which will be described later) over, for example, a network NW1.

The EC 31 is a one-chip microcomputer which monitors and controls various devices (the peripherals, sensors and so forth) regardless of a system state of the information processing apparatus 1. In addition, the EC 31 has a power source management function of controlling the power source circuit 33. Incidentally, the EC 31 is configured by a CPU, a ROM, a RAM (Random Access Memory) and so forth which are not illustrated in FIG. 1 and includes A/D input terminals, D/A output terminals, timers and digital input and output terminals for a plurality of channels. For example, the switch unit 32, the power source circuit 33 and so forth are connected to the EC 31 via the above-described input and output terminals and the EC 31 controls operations of the switch unit 32, the power source circuit 33 and so forth.

The switch unit 32 is configured by various control switches such as, for example, a power source switch, a reset switch and so forth.

The power source circuit 33 includes, for example, a DC/DC converter, a charge/discharge unit, a battery unit, an AC/DC adopter and so forth and converts a DC voltage which is supplied from the AC/DC adopter or the battery unit into a plurality of voltages which is necessary to operate the information processing apparatus 1. In addition, the power source circuit 33 supplies electric power to respective units of the information processing apparatus 1 based on control from the EC 31. In addition, the power source circuit 33 partially stops power supply in accordance with a mode concerned, for example, when entering a power-down mode (a low power consumption mode) such as a sleep mode and so forth.

The TPM 40 is a security chip which has tamper resistance for safe management of the information processing apparatus 1. The TPM 40 executes various security-related processes such as, for example, key generation, authentication information generation and so forth for an encryption process.

Figure 2:
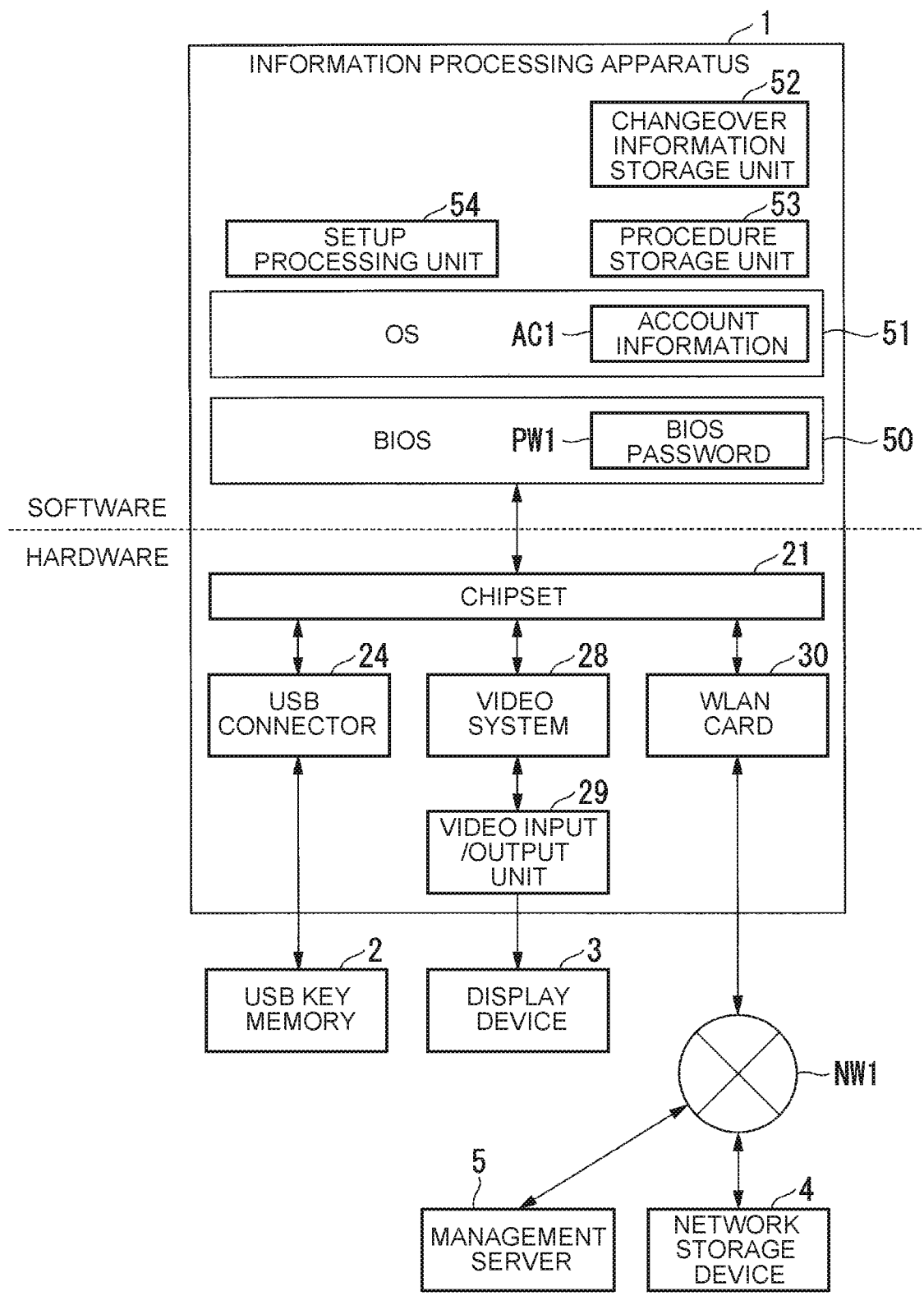
FIG. 2 is a block diagram illustrating functional configurations of the information processing apparatus according to one or more examples of the present disclosure.

In addition, FIG. 2 is a block diagram illustrating one example of functional configurations of the information processing apparatus 1 according to the present embodiment.

As illustrated in FIG. 2, the information processing apparatus 1 includes a BIOS 50, an OS 51, a changeover information storage unit 52, a procedure storage unit 53 and a setup processing unit 54. Incidentally, the respective functional configurations of the information processing apparatus 1 which are illustrated in FIG. 2 are realized by the above-described hardware configurations of the information processing apparatus 1 which are illustrated in FIG. 1. In addition, the information processing apparatus 1 includes the chipset 21, the USB connector 24, the video system 28, the video input and output unit 29 and the WLAN card 30 as the hardware configurations.

In addition, in executing the setup processing, the information processing apparatus 1 is connected to a USB key memory 2, a display device 3, the network storage device 4 and the management server 5 as illustrated in FIG. 2.

The USB key memory 2 (one example of the external storage device) is connected to the information processing apparatus 1 via the USB connector 24 and stores various kinds of information which are necessary in executing the setup processing. For example, network setting information such as an SSID (Service Set Identifier), an encryption key and so forth which are used for connection to the wireless LAN, setup information and license keys which are used for installation of various kinds of application software and so forth are included in the information that the USB key memory 2 stores.

The display device 3 is, for example, a liquid crystal display device and is used to display reference materials and so forth in holding a conference by using the information processing apparatus 1. The display device 3 is connected with the information processing apparatus 1 via, for example, the video input/output unit 29. In a case where the information processing apparatus 1 is started up in response to execution of the setup processing, the display device 3 displays, for example, a display screen of dedicated software for schedule management as a desktop screen.

The network storage device 4 is, for example, a cloud server and is utilized for information sharing in the conference system. In addition, the management server 5 is a server device which conducts various kinds of management of the information processing apparatus 1 and, for example, provides the dedicated software for schedule management and supplies update data of the dedicated software to the information processing apparatus 1. The network storage device 4 and the management server 5 are connected with the information processing apparatus 1 over the network NW1 by using, for example, the WLAN card 30.

The BIOS 50 (one example of a basic input and output system) is realized by, for example, reading a program which is stored in the BIOS memory 22 into the main memory 12 and executing the program by the CPU 11. The BIOS 50 starts up the OS 51 and controls input/output between the information processing apparatus 1 and the outside. The BIOS 50 changes setting of input and output between the information processing apparatus 1 and the outside in accordance with a setting change request. The BIOS 50 holds a password (a BIOS password PW1) which is used to change the setting of the BIOS 50. The BIOS 50 collates the BIOS password PW1 which is registered in the BIOS 50 with a password which is input from the outside and permits change of various settings of the BIOS 50 including change of the BIOS password PW1 in a case where both the passwords match each other.

The OS 51 is a general-purpose OS such as, for example, Windows IoT (Windows is the registered trademark) and so forth. The OS 51 is realized by, for example, reading a program which is stored in the SSD 23 into the main memory 12 and executing the program by the CPU 11. The OS 51 is the general-purpose OS and therefore the application software of the conference system, the dedicated software for schedule management and so forth are installed on the OS 51 in order to make the information processing apparatus 1 function as a conference apparatus (an apparatus which is dedicated to the conference concerned).

In addition, the OS 51 holds account information AC1 which is necessary in using the OS 51. For example, manager's account information and user's account information are included in the account information.

The changeover information storage unit 52 is configured by, for example, some areas of the SSD 23 and stores changeover information which is used for changing over the display screen in starting up the OS 51. Here, the changeover information is, for example, a changeover flag and is set so as to inhibit display of a standard startup screen of the OS 51 and to change over the display screen to a dedicated display screen at the time of starting up the OS 51 in a process for manufacturing the information processing apparatus 1.

The procedure storage unit 53 is configured by, for example, some areas of the SSD 23 and stores a setup procedure which describes the procedure for setup processing for the information processing apparatus 1. Here, the setup processing is executed in a case where the information processing apparatus 1 is shipped and is started up for the first time and various settings for making the information processing apparatus 1 function as the conference apparatus, installation of the application software and so forth are executed. The setup procedure which is customized in accordance with a use application of the information processing apparatus 1 that the user uses and a request from the user is stored in the procedure storage unit 53 as a setup procedure file in the process for manufacturing the information processing apparatus 1.

For example, in using the information processing apparatus 1 as the conference apparatus, the changeover information storage unit 52 stores the setup procedure based on which the following setup processing is executed.

(1) A process for generating a user account
(2) A process for setting a cloud
(3) A process for updating the dedicated software
(4) A process for installing the application for the conference system
(5) A process for encrypting the drive
(6) A process for setting the BIOS password PW1
(7) A process for enabling Device Protection and Group Policy
(8) A process for setting the dedicated software as a desktop shelf Incidentally, details of the respective processes (1) to (8) in the setup procedure for the setup processing will be described later.

The setup processing unit 54 is realized by, for example, reading a program which is stored in the SSD 23 into the main memory 12 and executing the program by the CPU 11. In a case where the OS 51 which is in the initial state is started up for the first time, the setup processing unit 54 executes the setup processing for the information processing apparatus 1 based on the setup procedure that the procedure storage unit 53 stores therein. The setup processing unit 54 executes the setup processing based on the setup procedure of the above-described processes (1) to (8).

Incidentally, a case where the OS 51 is started up for the first time in a post-shipment (post-purchase) state, a case where the OS 51 is started up for the first time after reinstallation of the OS 51 and so forth are included in the case where the OS 51 which is in the initial state is started up for the first time.

For example, the user account generating process for generating user account information (account information AC1) is included in the setup procedure as indicated in the above process (1). The setup processing unit 54 executes the account generating process based on the setup procedure as one process of the setup processing. The setup processing unit 54 automatically generates the user account information (an account ID and a password) by, for example, a predetermined generation method which is defined in advance and registers the generated user account information into the OS 51.

In addition, the process for configuring a setting for utilizing the network storage device 4 which is connectable to the information processing apparatus 1 over the network NW1 is included in the setup procedure as indicated in the above process (2). The setup processing unit 54 performs the setting for utilizing the network storage device 4 (a cloud server) based on the setup procedure.

In addition, the process for updating the desiccated software is included in the setup procedure as indicated in the above process (3). Here, the dedicated software is, for example, the above-described dedicated software for schedule management. The setup processing unit 54 executes the process for updating the dedicated software on the bases of the setup procedure. The setup processing unit 54 updates the dedicated software by connecting the information processing apparatus 1 with the management server 5 over, for example, the network NW1 and acquiring update data from the management server 5.

In addition, the process for installing the application software which is used to make the information processing apparatus 1 function as a dedicated apparatus for specific use application is included in the setup procedure as indicated in the above process (4). Here, the application for conference system such as, for example, Skype for Business (Skype is a registered trademark) and so forth corresponds to the application software which is used to make the information processing apparatus 1 function as the dedicated apparatus for a specific use application. The setup processing unit 54 executes the process for installing these pieces of application software based on the setup procedure. The setup processing unit 54 executes the process for installing the above-described application software by using, for example, the setup information that the USB key memory 2 stores therein.

In addition, the process for encrypting the drive is included in the setup procedure as indicated in the above process (5). The setup processing unit 54 executes the process for encrypting the SDD 23 based on the setup procedure. The setup processing unit 54 encrypts the SDD 23 by enabling, for example, BitLocker (a registered trademark).

In addition, the process for setting the BIOS password PW1 is included in the setup procedure as indicated in the above process (6). The setup processing unit 54 executes the process for setting the BIOS password PW1 based on the setup procedure. The setup processing unit 54 sets an initial value of the password which is generated in accordance with a predetermined algorithm which is defined in advance as the password based on the setup procedure. That is, the setup processing unit 54 automatically generates the initial value of the BIOS password PW1 in accordance with the predetermined generation algorithm which is defined in advance and registers the generated initial value of the BIOS password PW1 into the BIOS 50.

In addition, the process for enabling Device Protection and Group Policy is included in the setup procedure as indicated in the above process (7). The setup processing unit 54 executes the process for enabling Device Protection and Group Policy based on the setup procedure. That is, the setup processing unit 54 enables the function of protecting the application software and restricts installation of other application software. Thereby, the setup processing unit 54 inhibits change and deletion of the already installed software and makes installation of other application software impossible.

In addition, the process for setting the dedicated software as the desktop shelf is included in the setup procedure as indicated in the above process (8). That is, the process for configuring a setting for starting up the dedicated software which is installed in advance on the desktop screen in starting up the OS 51 after execution of the setup processing is included in the setup procedure. Here, the dedicated software is the above-described dedicated software for schedule management. The setup processing unit 54 performs the setting for starting up the dedicated software for schedule management on the desktop screen in starting up the OS 51 is started up in response to execution of the setup processing based on the setup procedure.

In addition, in starting up the OS 51, the setup processing unit 54 changes over the display screen from a standard startup screen of the OS 51 to a dedicated display screen based on the changeover information that the changeover information storage unit 52 stores and makes the display device 3 display the changed-over dedicated display screen. That is, in starting up the OS 51, the information processing apparatus 1 does not display the standard startup screen of the OS 51 and displays the dedicated display screen.

In addition, the setup processing unit 54 acquires information which is necessary in executing the setup processing from the USB key memory 2 which is connected to the USB connector 24. Network setting information (for example, SSID (Service Set Identifier) and an encryption key of the wireless LAN) which is used to connect the information processing apparatus 1 to the network NW1 is included in the information which is necessary in executing the setup processing. In executing the setup processing, the setup processing unit 54 connects the information processing apparatus 1 to the network NW1 based on the network setting information which is acquired from the USB key memory 2.

Incidentally, in a case where the information processing apparatus 1 is in a state of being not connected to the network NW1 in executing the setup processing, the setup processing unit 54 makes the display device 3 display a display screen which instructs to connect the USB key memory 2 from which acquisition of the network setting information is possible to the USB connector 24.

Next, operations of the information processing apparatus 1 according to the present embodiment will be described with reference to the drawings.

Figure 3:
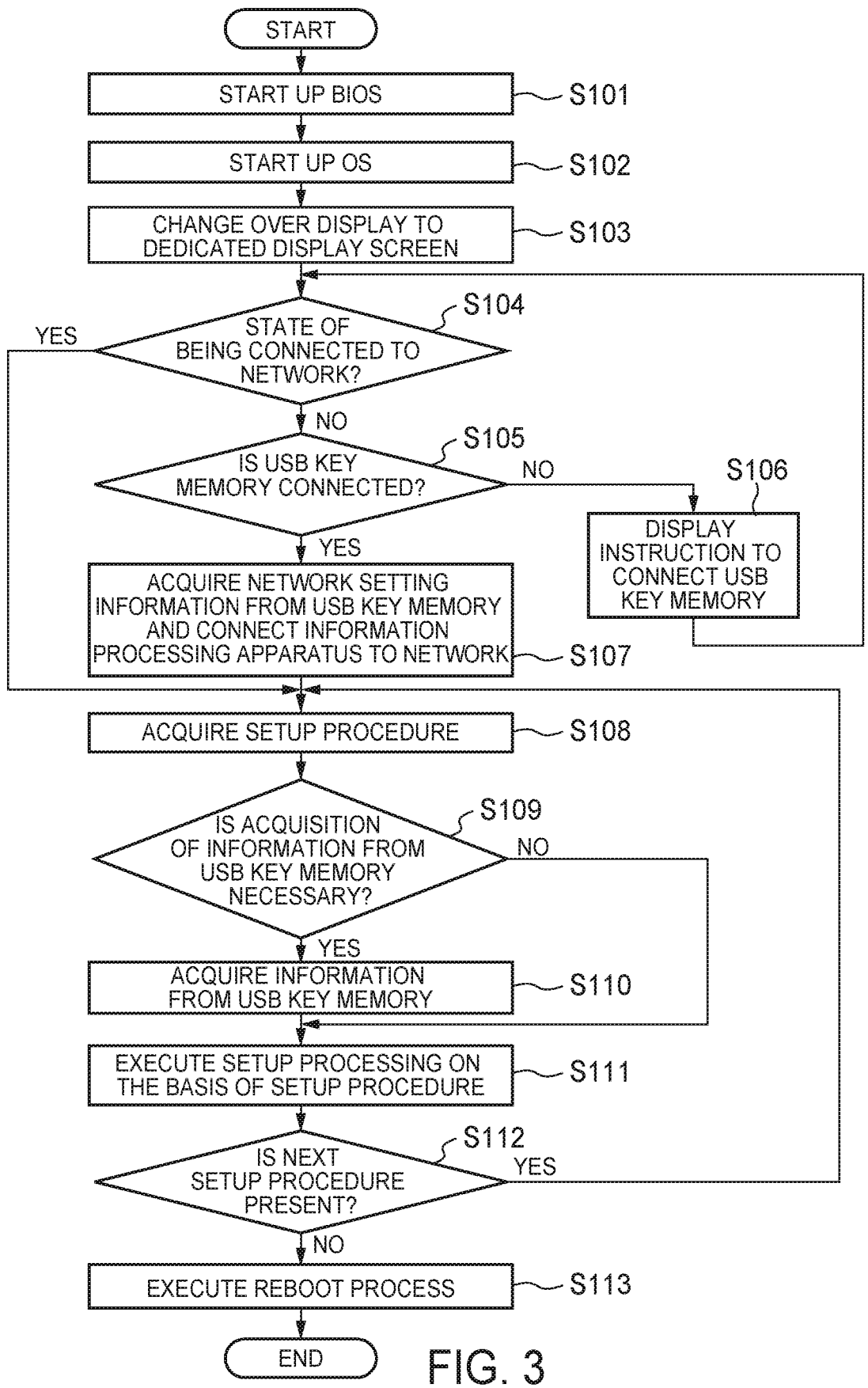
FIG. 3 is a flowchart illustrating setup processing of the information processing apparatus according to one or more examples of the present disclosure.

FIG. 3 is a flowchart illustrating one example of the setup processing of the information processing apparatus 1 according to the present embodiment. Incidentally, here, the operations which are performed in starting up the information processing apparatus 1 which is in the post-shipment state for the first time will be described.

As illustrated in FIG. 3, when a power source switch of the switch unit 32 is depressed, the electric power is supplied from the power source circuit 33 to the respective units of the information processing apparatus 1 and, first, the BIOS 50 is started up (step S101).

Next, the BIOS 50 starts up the OS 51 (step S102).

Next, the setup processing unit 54 of the information processing apparatus 1 changes over the display screen to the dedicated display screen (step S103). The setup processing unit 54 acquires the changeover information from the changeover information storage unit 52 and makes the display device 3 display the display screen by changing over from the standard startup screen of the OS 51 to such a dedicated display screen as that illustrated in FIG. 4 based on the changeover information. Incidentally, since the changeover information is set to change over the display screen to the dedicated display screen at the time of shipment, the setup processing unit 54 change overs the display screen to the dedicated display screen.

Figure 4:
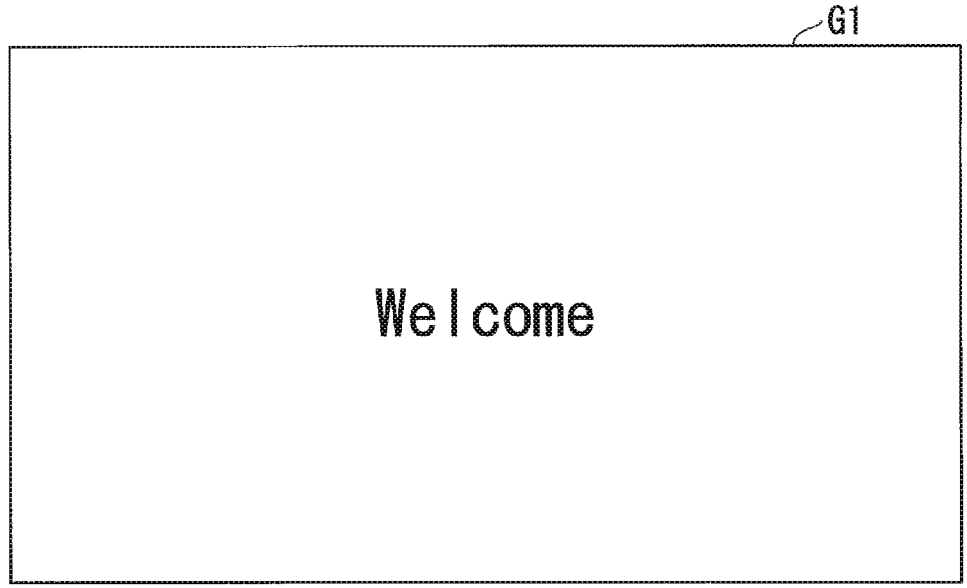
FIG. 4 is a diagram illustrating an initial screen of the setup processing according to one or more examples of the present disclosure.

FIG. 4 is a diagram illustrating one example of an initial screen of the setup processing according to the present embodiment. In the setup processing, an initial screen of the standard startup screen (for example, Windows (the registered trademark)) of the OS 51 is not displayed and the initial screen (the dedicated display screen) such as a screen G1 which is illustrated in FIG. 4 is displayed.

Next, the setup processing unit 54 decides whether the information processing apparatus 1 is connected to the network NW1 (step S104). In a case where the information processing apparatus 1 is connected to the network NW1 (step S104: YES), the setup processing unit 54 proceeds the process to step S108. In addition, in a case where the information processing apparatus 1 is not connected to the network NW1 (step S104: NO), the setup processing unit 54 proceeds the process to step S105.

In step S105, the setup processing unit 54 decides whether the USB key memory 2 is connected to the USB connector 24. In a case where the USB key memory 2 is connected to the USB connector 24 (step S105: YES), the setup processing unit 54 proceeds the process to step S107. In addition, in a case where the USB key memory 2 is not connected to the USB connector 24 (step S105: NO), the setup processing unit 54 proceeds the process to step S106.

In step S106, the setup processing unit 54 makes the display device 3 display a message (for example, "Please connect the USB key memory" and so forth) which encourages the user to connect the USB key memory 2 to the USB connector 24 as an instruction to connect the USB key memory 2 to the USB connector 24. In response to execution of the process in step S106, the setup processing unit 54 returns the process to the step S104.

In addition, in step S107, the setup processing unit 54 acquires the network setting information from the USB key memory 2 and connects the information processing apparatus 1 to the network NW1. That is, the setup processing unit 54 connects the information processing apparatus 1 to the network NW1 by acquiring the SSID and the encryption key of the wireless LAN from the USB key memory 2 and setting these pieces of information on the WLAN card 30.

Next, in step S108, the setup processing unit 54 acquires the setup procedure. That is, the setup processing unit 54 acquires the setup procedures which are stored in advance in the procedure storage unit 53 in order.

Next, the setup processing unit 54 decides whether it is necessary to acquire information from the USB key memory 2 (step S109). The setup processing unit 54 decides whether information which is necessary in executing the setup processing based on the setup procedure is present. In a case where it is necessary to acquire the information from the USB key memory 2 (step S109: YES), the setup processing unit 54 proceeds the process to step S110. In a case where it is not necessary to acquire the information from the USB key memory 2 (step S109: NO), the setup processing unit 54 proceeds the process to step S111.

In step S110, the setup processing unit 54 acquires the information from the USB key memory 2. The setup processing unit 54 acquires the information which is necessary for execution of the setup processing (for example, setup information, license keys and so forth which are used for installation of various kinds of application software) from the USB key memory 2.

Next, in step S111, the setup processing unit 54 executes the setup processing based on the setup procedure. That is, the setup processing unit 54 executes the setup processing which includes processes such as the above-described processes (1) to (8).

Next, the setup processing unit 54 decides whether the next setup procedure is present (step S112). The setup processing unit 54 decides whether the setup procedure to be executed the next is present in the procedure storage unit 53. In a case where the next setup procedure is present (step S112: YES), the setup processing unit 54 returns the process to step S108 and repeats execution of the processes in step S108 to step S112. In addition, in a case where the next setup procedure is not present (step S112: NO), the setup processing unit 54 proceeds the process to step S113.

Figure 5:
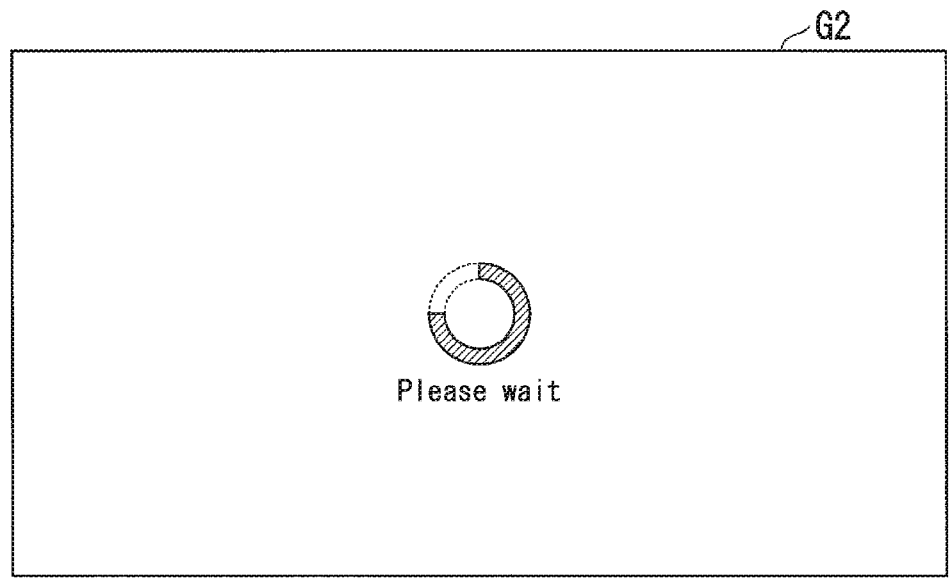
FIG. 5 is a diagram illustrating a display screen during the setup processing according to one or more examples of the present disclosure.

Incidentally, the setup processing unit 54 makes the display device 3 display a display screen such as a display screen G2 which is illustrated in FIG. 5 while the processes in step S108 to step S112 are being executed.

FIG. 5 is a diagram illustrating one example of the display screen which is displayed while the setup processing according to the present embodiment is being executed.

As illustrated in FIG. 5, a wait screen (the dedicated display screen) such as the display screen G2 is displayed while the setup processing is being executed.

In addition, in step S113, the setup processing unit 54 executes a reboot process (a restart process) for rebooting (restarting) the information processing apparatus 1 and then terminates execution of the setup processing.

Figure 6:
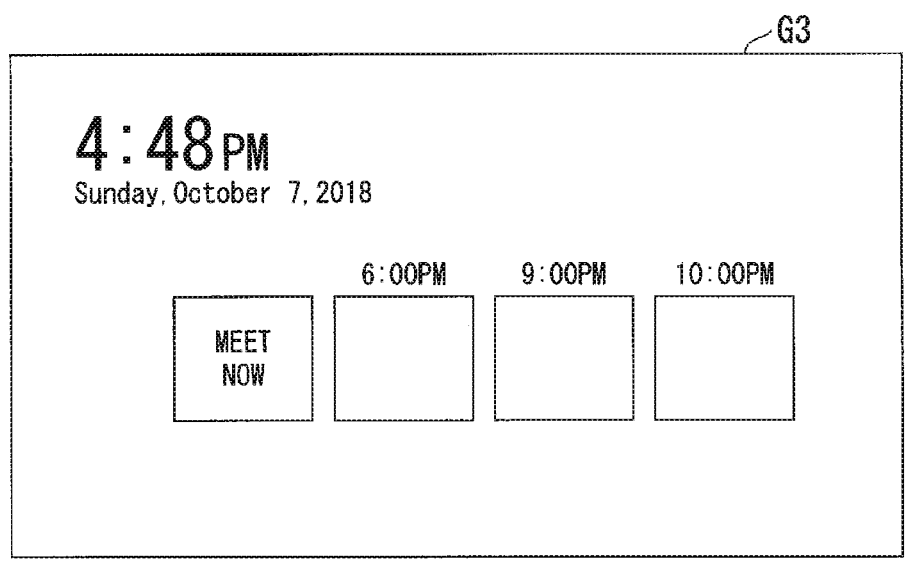
FIG. 6 is a diagram illustrating a desktop screen after execution of the setup processing according to one or more examples of the present disclosure.

Incidentally, the information processing apparatus 1 (that is, the setup processing unit 54) makes the display device 3 display a screen of the dedicated software for schedule management such as a screen G3 which is illustrated in FIG. 6 on the desktop screen after execution of the setup processing.

FIG. 6 is a diagram illustrating one example of the desktop screen which is displayed after execution of the setup processing according to the present embodiment. In a case where the information processing apparatus 1 is started up after execution of the setup processing, the information processing apparatus 1 makes the display device 3 display not the standard startup screen of the OS 51 but the dedicated software display screen such as the screen G3 as the desktop screen based on the changeover information that the changeover information storage unit 52 stores.

Figure 7:
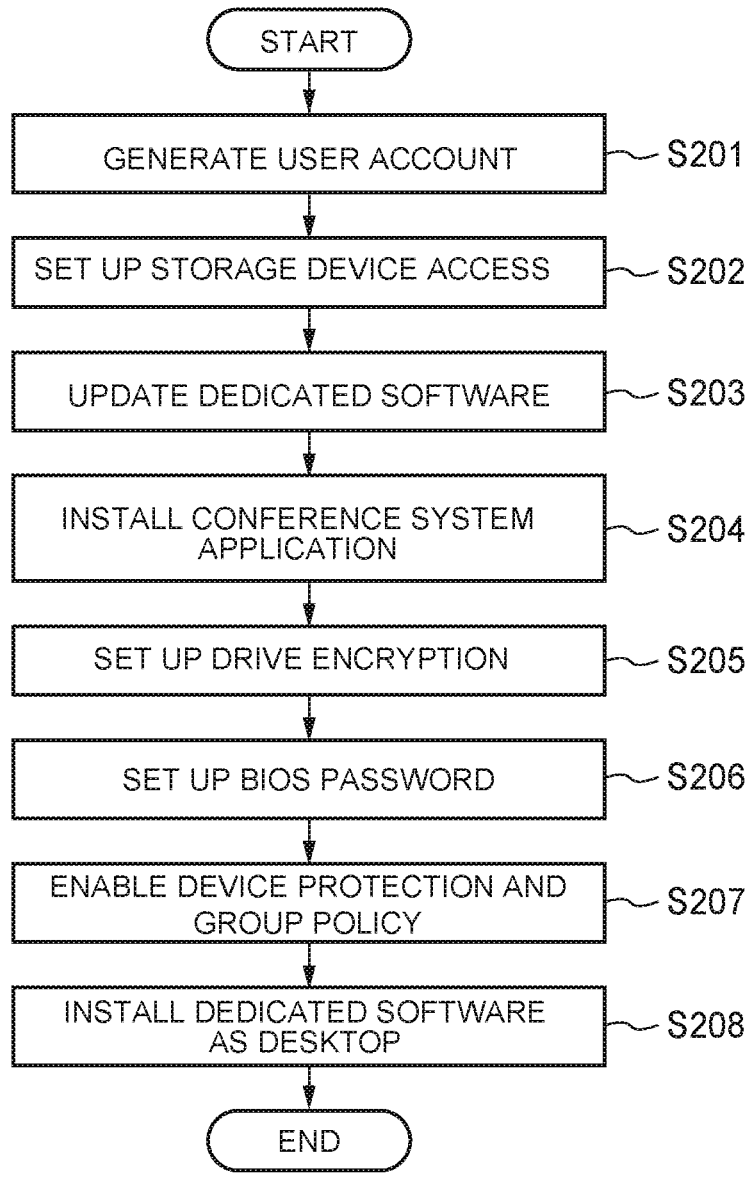
FIG. 7 is a flowchart illustrating a setup procedure for the setup processing for the information processing apparatus according to one or more examples of the present disclosure.

In addition, FIG. 7 is a flowchart illustrating one example of setup processing which is based on a setup procedure (the setup procedure for the setup processing) for the information processing apparatus 1 according to the present embodiment.

The example which is illustrated in FIG. 7 indicates a case where the setup processing is executed by repeating execution of the processes in step S108 to step S112 in FIG. 3 based on the setup procedure for the setup processing which includes the above-described processes (1) to (8).

As illustrated in FIG. 7, first, the setup processing unit 54 executes the process for generating the user account as one process of the setup processing based on the setup procedure for the setup processing which includes the processes (1) to (8) (step S201). The setup processing unit 54 automatically generates the user account information (the account ID and the password) by, for example, the predetermined generation method which is defined in advance and registers the generated user account information into the OS 51.

Next, the setup processing unit 54 executes the process for setting the cloud as one process of the setup processing (step S202). The setup processing unit 54 performs the setting for utilizing the network storage device 4 (the cloud server) by utilizing, for example, a security function by the TPM 40.

Next, the setup processing unit 54 executes the process for updating the dedicated software as one process of the setup processing (step S203). The setup processing unit 54 acquires the update data from the management server 5 and updates the dedicated software based on the acquired update data by connecting the information processing apparatus 1 with the management server 5 over, for example, the network NW1.

Next, the setup processing unit 54 executes the process for installing the application for conference system as one process of the setup processing (step S204). The setup processing unit 54 acquires the setup information such as, for example, Skype for Business (Skype is the registered trademark) and so forth that the USB key memory 2 stores and executes the process for installing the application for conference system by using the acquired setup information. Thereby, the information processing apparatus 1 functions as the conference apparatus.

Next, the setup processing unit 54 executes the process for encrypting the drive as one process of the setup processing (step S205). The setup processing unit 54 enables, for example, BitLocker (the registered trademark) and encrypts the SDD 23.

Next, the setup processing unit 54 executes the process for setting the BIOS password PW1 as one process of the setup processing (step S206). The setup processing unit 54 automatically generates the initial value of the BIOS password PW1 in accordance with the predetermined generation algorithm which is defined in advance and registers the generated initial value of the BIOS password PW1 into the BIOS 50.

Next, the setup processing unit 54 executes the process for enabling Device Protection and Group Policy as one process of the setup processing (step S207). That is, the setup processing unit 54 enables the function of protecting the application software and restricts installation of other application software. Thereby, the setup processing unit 54 inhibits change and deletion of the already installed software and makes installation of other application software impossible.

Next, the setup processing unit 54 executes the process for setting the dedicated software as the desktop shelf as one process of the setup processing (step S208). The setup processing unit 54 performs the setting for starting up the dedicated software for schedule management on the desktop screen in starting up the OS 51 after execution of the setup processing. Thereby, the information processing apparatus 1 comes to display the screen such as the screen G3 of the dedicated software of schedule management which is illustrated in FIG. 6 on the desktop screen of the display device 3 after execution of the setup processing. The setup processing unit 54 terminates execution of the setup processing after execution of the process in step S208.

As described above, the information processing apparatus 1 according to the present embodiment includes the procedure storage unit 53 and the setup processing unit 54. The procedure storage unit 53 stores therein the setup procedure which describes the procedure for the setup processing, that is, the setup procedure which includes at least the account generating process for generating the user account information which is necessary in using the OS 51 (the general-purpose OS). The setup processing unit 54 executes the setup processing for the information processing apparatus 1 which includes at least the account generating process based on the setup procedure that the procedure storage unit 53 stores in starting up the OS 51 which is in the initial state for the first time.

Thereby, the information processing apparatus 1 according to the present embodiment makes it possible for the user to execute the setup processing based on the setup procedure with no need to input the setting information by using the input device and therefore it becomes possible to execute the setup processing simply and easily. In addition, since the information processing apparatus 1 according to the present embodiment makes it possible to automatically execute the account generating process, it becomes possible to more improve simplicity and easiness. The information processing apparatus 1 according to the present embodiment makes it possible to automatically execute almost all the processes in the setup processing without input of the setting information by the user.

In addition, the information processing apparatus 1 according to the present embodiment includes the changeover information storage unit 52 which stores therein the changeover information which is used to change over the display screen in starting up the OS 51 (the general-purpose OS) which is in the initial state for the first time. In starting up the OS 51, the setup processing unit 54 changes over the display screen from the standard startup screen of the OS 51 to the dedicated display screen based on the changeover information that the changeover information storage unit 52 stores and then makes the display device 3 display the dedicated display screen.

Thereby, the information processing apparatus 1 according to the present embodiment makes it possible to display the dedicated display screen with no consciousness of use of the OS 51 while using the OS 51 (the general-purpose OS) and therefore it becomes possible to function the information processing apparatus 1 as the dedicated apparatus with ease by using the general-purpose OS.

In addition, the information processing apparatus 1 according to the present embodiment includes the USB connector 24 (the external interface unit) which is connectable with the USB key memory 2 (the external storage device). The setup processing unit 54 acquires the information which is necessary in executing the setup processing from the USB key memory 2 which is connected to the USB connector 24.

Thereby, the information processing apparatus 1 according to the present embodiment makes it possible for the user to execute the setup processing more simply and easily by utilizing the USB key memory 2 (the external storage device) with no need to input the setting information by using the input device.

In addition, in the present embodiment, the network setting information (for example, the SSID, the encryption key and so forth) which is used to connect the information processing apparatus 1 to the network NW1 is included in the information which is necessary in executing the setup processing. In executing the setup processing, the setup processing unit 54 connects the information processing apparatus 1 to the network NW1 based on the network setting information which is acquired from the USB key memory 2.

Thereby, it becomes possible to automatically connect the information processing apparatus 1 according to the present embodiment to the network NW1 in executing the setup processing and it becomes possible to more improve the simplicity and easiness.

In addition, in the present embodiment, in a case where the information processing apparatus 1 is in a state of being not connected to the network NW1 in executing the setup processing, the setup processing unit 54 makes the display device 3 display the display screen which instructs to connect the USB key memory 2 from which acquisition of the network setting information is possible to the USB connector 24.

Thereby, it becomes possible to connect the information processing apparatus 1 according to the present embodiment to the network NW1 and then to execute the setup processing which utilizes the network NW1. Accordingly, the information processing apparatus 1 according to the present embodiment makes it possible to efficiently execute the setup processing by utilizing the network NW1.

In addition, in the present embodiment, the process for performing the setting for utilizing the network storage device 4 which is connectable to the information processing apparatus 1 over the network NW1 is included in the setup procedure. The setup processing unit 54 performs the setting for utilizing the network storage device 4 based on the setup procedure.

Thereby, the information processing apparatus 1 according to the present embodiment makes it possible to automatically execute the setup processing even in a case where the information processing apparatus 1 is used for, for example, a use application which utilizes a cloud environment and so forth.

In addition, in the present embodiment, the process for installing the application software (for example, the software for conference and so forth) which is used to make the information processing apparatus 1 function as the dedicated apparatus for the specific use application (for example, the conference apparatus) is included in the setup procedure. The setup processing unit 54 executes the process for installing the application software based on the setup procedure.

Thereby, the information processing apparatus 1 according to the present embodiment makes it possible to automatically execute the process for installing the application software and therefore it becomes possible to execute the setup processing more simply and easily.

In addition, in the present embodiment, the process for enabling the function of protecting the application software which is installed by the installing process and restricting installation of other application software is included in the setup procedure. The setup processing unit 54 enables the function of protecting the application software and restricts installation of other application software based on the setup procedure.

Thereby, since addition and change of application software are restricted, the information processing apparatus 1 according to the present embodiment makes it possible to reduce a possibility that the application software would be falsified and misused and thereby it becomes possible to realize the dedicated apparatus for specific use application (for example, the conference apparatus) with ease by using the general-purpose OS. The information processing apparatus 1 according to the present embodiment makes it possible to block a user-unintended operation of the OS 51.

In addition, in the present embodiment, the process for setting the password (for example, the BIOS password PW1) which is used to start up the OS 51 (the general-purpose OS) and to change the setting of the BIOS 50 (the basic input/output system) which controls input/output between the outside and the information processing apparatus 1 is included in the setup procedure. The setup processing unit 54 executes the process for setting the BIOS password PW1 and sets the initial value of the BIOS password PW1 which is generated in accordance with the predetermined algorithm which is defined in advance as the BIOS password PW1 based on the setup procedure.

Thereby, the information processing apparatus 1 according to the present embodiment makes it possible to automatically generate the BIOS password PW1 and thereby it becomes possible to more improve the simplicity and easiness. In addition, since the information processing apparatus 1 according to the present embodiment makes it possible to protect the BIOS 50 (the basic input/output system), it becomes possible to improve security.

In addition, in the present embodiment, the process for performing the setting for starting up the dedicated software which is installed in advance on the desktop screen in starting up the OS 51 (the general-purpose OS) after execution of the setup processing is included in the setup procedure. The setup processing unit 54 performs the setting for starting up the dedicated software on the desktop screen based on the setup procedure in starting up the OS 51 after execution of the setup processing.

Thereby, in the information processing apparatus 1 according to the present embodiment, since the screen G3 of the dedicated software is automatically displayed as illustrated in FIG. 6, it becomes possible to realize the dedicated apparatus for the specific use application (for example, the conference apparatus) with ease by using the general-purpose OS.

In addition, according to another embodiment of the in various embodiments disclosed herein, there is provided a setup method. The setup method according to the present embodiment is the setup method for the information processing apparatus 1 which includes the procedure storage unit 53 which stores therein the setup procedure which describes the procedure for the setup processing, that is, the setup procedure which includes at least the account generating process for generating the user account information which is necessary in using the OS 51 (the general-purpose OS). The setup method includes the acquiring step and the setup processing step. In the acquiring step, in starting up the OS 51 which is in the initial state for the first time, the setup processing unit 54 acquires the setup procedure that the procedure storage unit 53 stores. In the setup processing step, the setup processing unit 54 executes the setup processing of the information processing apparatus 1 which includes the account generating process based on the setup procedure which is acquired in the acquiring step.

Thereby, the setup method according to the present embodiment exhibits the same effects as the above-described information processing apparatus 1 and makes it possible to execute the setup processing simply and easily.

Incidentally, the in various embodiments disclosed herein is not limited to the above-described embodiments and may be modified and altered within the range not deviating from the gist of the in various embodiments disclosed herein.

For example, although in the above-described embodiment, the example that the conference apparatus is given as one example of the information processing apparatus 1 is described, the example of the information processing apparatus 1 is not limited to the conference apparatus. The information processing apparatus 1 may be a dedicated apparatus for another use application and may be, for example, an IoT equipment and so forth.

In addition, although in the above-described embodiment, the example that the OS 51 of the information processing apparatus 1 is Windows IoT (Windows is the registered trademark) is described, the OS 51 may be a general-purpose OS of another type.

In addition, although in the above-described embodiment, the example that the USB key memory 2 is connected to the information processing apparatus 1 in executing the setup processing is described, connection of the USB key memory 2 is not limited to this example. For example, in a case where acquisition of the setting information from the USB key memory 2 is not necessary, the USB key memory 2 may not be connected to the information processing apparatus 1.

In addition, although in the above-described embodiments the example that the information processing apparatus 1 is connected with the network NW1 via the wireless LAN is described, the information processing apparatus 1 may be connected to the network NW1 via a wired LAN.

Incidentally, each of the configurations that the above-described information processing apparatus 1 includes has a computer system therein. Then, each process in each configuration that the above-described information processing apparatus 1 includes may be performed by recording a program which is used to realize the function of each configuration that the above-described information processing apparatus 1 includes onto a computer readable recording medium, reading the program which is recorded onto the recording medium into the computer systems and executing the program. Here, "reading the program which is recorded onto the recording medium into the computer system and executing the program" includes installation of the program on the computer system. The "computer system" which is mentioned here includes the OS and hardware such as the peripherals and so forth.

In addition, the "computer system" may include a plurality of computer devices which is connected to the information processing apparatus 1 over the network which includes communications lines such as the Internet, a WAN (Wide Area Network), the LAN, a dedicated line and so forth. In addition, the "computer readable recording medium" means a portable medium such as a flexible disk, a magneto-optical disk, the ROM, a CD (Compact Disk)-ROM and so forth and a storage device such as a hard disk and so forth which is built in the computer system. The recording medium which stores the program therein may be a non-transitory recording medium such as the CD-ROM and so forth in this way.

In addition, a recording medium which is disposed on an inner part or an outer part which is accessible from a distribution server in order to distribute the program concerned is also included in the recording medium. Incidentally, configurations in each of which the program is divided into a plurality of programs and the divided programs are downloaded at mutually different timings and then are combined together by the respective configurations that the information processing apparatus 1 includes and the distribution servers which distribute the divided programs respectively may be different from one another respectively. Further, the "computer-readable recording medium" also include a medium which holds the program for a definite period of time such as the server in a case where the program is transmitted to the server over the network, a volatile memory (the RAM) which is built in the computer system which would become a client and so forth. In addition, the above-described program may be also a program which is used in order to realize some of the above-described functions. Further, the program may be also a program which makes it possible to realize the above-described functions in combination with a program which is already recorded in the computer system, that is, the so-called difference file (difference program).

In addition, some of or all the above-described functions may be realized in the form of an integrated circuit such as an LSI (Large Scale Integration) and so forth. The above-described respective functions may be configured to be performed by an embedded or standalone processor individually and may be configured to be performed by an embedded or standalone processor by integrating some of or all the functions. In addition, as methods for circuit integration, the circuit integration may be realized by a dedicated circuit or a general-purpose processor, not limited to the LSI. In addition, in a case where a technique of circuit integration which would take the place of the LSI appears owing to advancement of the semiconductor technology, an integrated circuit which is realized by the technique concerned may be used.

DESCRIPTION OF SYMBOLS 1 information processing apparatus, 2 USB key memory, 3 display device, 4 network storage device, 5 management server, 11 CPU, 12 main memory, 21 chipset, 22 BIOS memory, 23 SSD, 24 USB connector, 25 audio system, 26 microphone, 27 loudspeaker, 28 video system, 29 video input/output unit, 30 WLAN card, 31 EC, 32 switch unit, 33 power source circuit, 40 TPM, 50 BIOS, 51 OS, 52 changeover information storage unit, 53 procedure storage unit, 54 setup processing unit

What is claimed is:
1. An apparatus comprising:
a procedure storage unit configured to store a setup procedure describing setup processing for an information processing apparatus, wherein the setup procedure comprises at least an account generating process for generating user account information for a general-purpose operating system ("OS") of the information processing apparatus;
a changeover information storage unit configured to store changeover information for changing over a general-purpose OS display screen for the information processing apparatus to a dedicated display screen corresponding to a dedicated software application to run on the general purpose OS;
a setup processing unit configured, in response to the general-purpose OS of the information processing apparatus in an initial state starting up for the first time, to:
execute the setup processing for the information processing apparatus including the user account generating process based on the setup procedure stored by the procedure storage unit;
change over the general-purpose OS display screen to the dedicated display screen based on the changeover information stored by the changeover information storage unit; and
display the dedicated display screen on a display of the information processing apparatus; and
an external interface unit which is configured to connect with an external storage device, wherein the setup processing unit is configured to acquire information used for executing the setup processing from the external storage device in response to the external storage device being connected to the external interface unit.

2. The apparatus of claim 1, wherein the external storage device comprises a nonvolatile memory device.

3. The apparatus of claim 1, wherein
the information used for executing the setup processing comprises network setting information for connecting the information processing apparatus to a network, and
the setup processing unit is configured to connect the information processing apparatus to the network based on the network setting information stored on the external storage device.

4. The apparatus of claim 3, wherein
the setup processing unit is configured to display an instruction to connect the external storage device from which the network setting information is acquirable to the external interface unit.

5. The apparatus of claim 4, wherein
the setup procedure includes a process for configuring a setting for utilizing a network storage device that is connectable to the information processing apparatus over the network; and
the setup processing unit is configured to perform the setting for utilizing the network storage device based on the setup procedure.

6. The apparatus of claim 1, wherein
a process for installing application software which is adapted to make the information processing apparatus function as a dedicated apparatus for a specific use application is included in the setup procedure, and
the setup processing unit executes the process for installing the application software based on the setup procedure.

7. The information processing apparatus of claim 6, wherein:
the setup procedure comprise a process for enabling a function of protecting the application software which is installed by the application software installing process and for restricting installation of other application software; and
the setup processing unit is configured, based on the setup procedure, to enable the function of protecting the application software and to restrict installation of other application software.

8. The apparatus of claim 1, wherein
the setup procedure comprises a password setting process which is used to start up the general-purpose OS which is in the initial state and to change a setting of a basic input/output system which controls input/output of the information processing apparatus, and
the setup processing unit is configured to execute the password setting process and to set an initial value of the password which is generated in accordance with a predetermined algorithm which is defined in advance as the password based on the setup procedure.

9. The apparatus of claim 1, wherein
the setup procedure includes a process for configuring a setting for starting up dedicated software which is installed in advance on a desktop screen in starting up the general-purpose OS after execution of the setup processing, and
the setup processing unit is configured to perform the setting for starting up the dedicated software on the desktop screen based on the setup procedure in starting up the general-purpose OS after execution of the setup processing.

10. A method comprising:
accessing a setup procedure describing setup processing for an information processing apparatus, wherein the setup procedure comprises at least an account generating process for generating user account information for a general-purpose operating system ("OS") of the information processing apparatus;
accessing changeover information for changing over a general-purpose OS display screen for the information processing apparatus to a dedicated display screen;
in response to the general-purpose OS of the information processing apparatus in an initial state starting up for the first time:
executing the setup processing for the information processing apparatus including the user account generating process based on the setup procedure;
changing over the general-purpose OS display screen to the dedicated display screen based on the changeover information; and
displaying the dedicated display screen on a display of the information processing apparatus; and
connecting with an external storage device to acquire information used for executing the setup processing from the external storage device in response to the external storage device being connected to an external interface unit.

11. The method of claim 10, wherein the external storage device comprise a nonvolatile memory.

12. The method of claim 10, wherein executing the setup processing comprises:
configuring network setting information for connecting the information processing apparatus to a network, and
connecting the information processing apparatus to the network based on the network setting a information which is acquired from the external storage device.

13. The method of claim 12, further comprising displaying an instruction to connect the external storage device from which the network setting information is acquirable to the external interface unit.

14. The method of claim 13, further comprising configuring a setting for utilizing a network storage device based on the setup procedure.

15. The method of claim 10, further comprising installing, based on the setup procedure, application software which is adapted to make the information processing apparatus function as a dedicated apparatus for a specific use application.

16. The method of claim 15, further comprising enabling, based on the setup procedure, a function to protect the application software and to restrict installation of other application software.

17. The method of claim 10, further comprising:
executing a process for setting a password which is used to start up the general-purpose OS which is in the initial state and to change a setting of a basic input/output system which controls input/output of the information processing apparatus, and
setting set an initial value of the password generated in accordance with a predetermined algorithm.

18. The method of claim 10, further comprising configuring a setting for starting up dedicated software on the desktop screen based on the setup procedure in starting up the general-purpose OS in response to execution of the setup processing.

19. A program product comprising a computer readable storage medium that stores code executable by a processor, the executable code comprising code to:
access a setup procedure describing setup processing for an information processing apparatus, wherein the setup procedure comprises at least an account generating process for generating user account information for a general-purpose operating system ("OS") of the information processing apparatus;
access changeover information for changing over a general-purpose OS display screen for the information processing apparatus to a dedicated display screen; and
in response to the general-purpose OS of the information processing apparatus in an initial state starting up for the first time:
execute the setup processing for the information processing apparatus including the user account generating process based on the setup procedure;
change over the general-purpose OS display screen to the dedicated display screen based on the changeover information; and
display the dedicated display screen on a display of the information processing apparatus,
wherein the code is further executable to connect with an external storage device to acquire information used for executing the setup processing from the external storage device in response to the external storage device being connected to an external interface unit.

20. The program product of claim 19, wherein the external storage device comprise a nonvolatile memory.

* * * * *